US012746880B2

(12) United States Patent
Harms

(10) Patent No.: US 12,746,880 B2
(45) Date of Patent: Sep. 29, 2026

(54) BRACKET AND FASTENER CONFIGURATION FOR USE WITH OFF-ROAD VEHICLES AND STORAGE COOLERS

(71) Applicant: Jeremy Joseph Harms, Lake Park, IA (US)

(72) Inventor: Jeremy Joseph Harms, Lake Park, IA (US)

( * ) Notice: Subject to any disclaimer, the term of this patent is extended or adjusted under 35 U.S.C. 154(b) by 131 days.

(21) Appl. No.: 18/649,103

(22) Filed: Apr. 29, 2024

(65) Prior Publication Data

US 2024/0375593 A1 Nov. 14, 2024

Related U.S. Application Data

(60) Provisional application No. 63/500,693, filed on May 8, 2023.

(51) Int. Cl.
*B60R 9/06* (2006.01)

(52) U.S. Cl.
CPC .................................... *B60R 9/06* (2013.01)

(58) Field of Classification Search
CPC .................................. B60R 9/06; B60R 9/065
USPC .......................................................... 224/400
See application file for complete search history.

(56) References Cited

U.S. PATENT DOCUMENTS 5,165,645 A 11/1992 Brown
5,599,055 A * 2/1997 Brown ............... B62D 25/2054 410/97
6,755,428 B2 6/2004 Butler
8,356,789 B2 1/2013 Hardy et al.
9,352,698 B2 * 5/2016 Romanelli ................ B60R 9/06
10,151,520 B2 * 12/2018 Christensen .............. B62B 1/16
10,227,047 B2 3/2019 Purvis et al.
10,384,589 B2 * 8/2019 Llewellyn ................. B60P 7/06
10,611,312 B1 4/2020 Sullivan
10,865,015 B2 * 12/2020 Brennan ................... B60R 9/06
11,085,209 B2 8/2021 Llewellyn et al.
11,167,699 B2 11/2021 Wilckens et al.
11,591,826 B2 * 2/2023 Brennan ................. E05B 73/00
2005/0258330 A1 * 11/2005 Brewster ............ B65D 90/0013 248/500
2006/0076379 A1 4/2006 Hussaini et al.
2006/0237502 A1 * 10/2006 Tweet .................. B62D 31/003 224/42.32
2007/0152003 A1 7/2007 Dollar, Jr.
2007/0154276 A1 7/2007 Dollar, Jr.
2009/0020577 A1 * 1/2009 Johnson .................... B60R 9/06 224/519
2014/0223952 A1 8/2014 Smith et al.
2017/0101061 A1 4/2017 Morris
2021/0253012 A1 8/2021 Bursch
(Continued)

*Primary Examiner* — Peter N Helvey
(74) *Attorney, Agent, or Firm* — Dunlap Bennett & Ludwig PLLC

(57) ABSTRACT

A quick release bracketing apparatus for securing a cooler to the cargo bed of a vehicle. The quick release bracketing system includes at least a first an inner bracket and a first an outer bracket securable to the cargo bed of the vehicle utilizing a quick release fastening mechanism. Each of the first inner bracket and the second inner bracket includes a plurality of arms. Each of the plurality of arms is bent to fit into a separate one of a plurality of apertures disposed on a flange of the cooler.

1 Claim, 7 Drawing Sheets

(56) References Cited

U.S. PATENT DOCUMENTS

2023/0211735 A1* 7/2023 Czapski .................. B60R 11/00
224/400

* cited by examiner

BRACKET AND FASTENER CONFIGURATION FOR USE WITH OFF-ROAD VEHICLES AND STORAGE COOLERS

CROSS-REFERENCE TO RELATED APPLICATION

This application claims the benefit of priority of U.S. provisional application No. 63/500,693, filed May 8, 2023, the contents of which are herein incorporated by reference.

BACKGROUND OF THE INVENTION

The present invention relates to storage coolers and automobile accessories and, more particularly, a mount and bracket assembly for securing storage coolers, or similar items, to a cargo section and support structure of an off-road recreational and utility vehicle.

Traditional utility and service trucks are designed to have a bed for hauling cargo. A rachet strap is often used to secure cargo to the bed by wrapping a strap around the cargo, latching strap end mated hooks to supporting infrastructure of the bed and using a ratchet with strap mount and grip structure to tighten the straps. The ratchet strap can be cumbersome, complex, expensive, and take up excessive space when in use.

Off-road vehicles have designs tailored for particular off roading applications, such as recreational uses, e.g., hunting, fishing, and camping, and utility uses, e.g., farming and ranching. The vehicles are designed to be small and nimble. Although a ratchet strap may be sufficient in certain use cases for traditional utility and service trucks, the ratchet strap is certainly not sufficient for use in off-road recreational and utility vehicles.

As can be seen, there is a need for a mount and bracket assembly for securing storage coolers that optimize cargo space in off-road recreational and utility vehicles.

SUMMARY OF THE INVENTION

In one aspect of the present invention, a quick release bracketing apparatus is disclosed. The apparatus can include an inner bracket monolithically formed to include a first body, a first plurality of arms, and at least one first mounting plate, extending from the first body. The inner bracket can be mounted to the perimeter of a cargo bed of a vehicle utilizing a first quick release fastener mounted to the at least one first mounting plate. The apparatus also includes an outer bracket monolithically formed to include a second body, a second plurality of arms, and at least one second mounting plate, extending from the second body. The outer bracket can be mounted to the perimeter of a cargo bed of a vehicle utilizing a second quick release fastener mounted to the at least one first mounting plate.

In another aspect of the present invention, the quick release bracketing apparatus can be included in a system with a cooler, and a vehicle. The cooler of the system can have a plurality of apertures disposed on a flange of the cooler. In the system, each of the inner bracket and outer bracket can be secured to a cargo bed of the vehicle utilizing a quick release fastener. Furthermore, in the system each of the plurality of arms from both of the inner bracket and the outer bracket can be fit into a separate one of the plurality of apertures of the cooler, thereby forming a secure attachment.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

It should be understood by those skilled in the art that the use of directional terms such as upper, lower, upward, downwardly, top, left, right and the like are used in relation to the illustrative embodiments as they are depicted in the figures, the upward direction (or upper) being toward the top of the corresponding figures, the downward direction being toward the bottom of the corresponding figures.

It should be understood, of course, that the foregoing relates to exemplary embodiments of the invention and that modifications may be made without departing from the spirit and scope of the present invention.

Figure 1A:
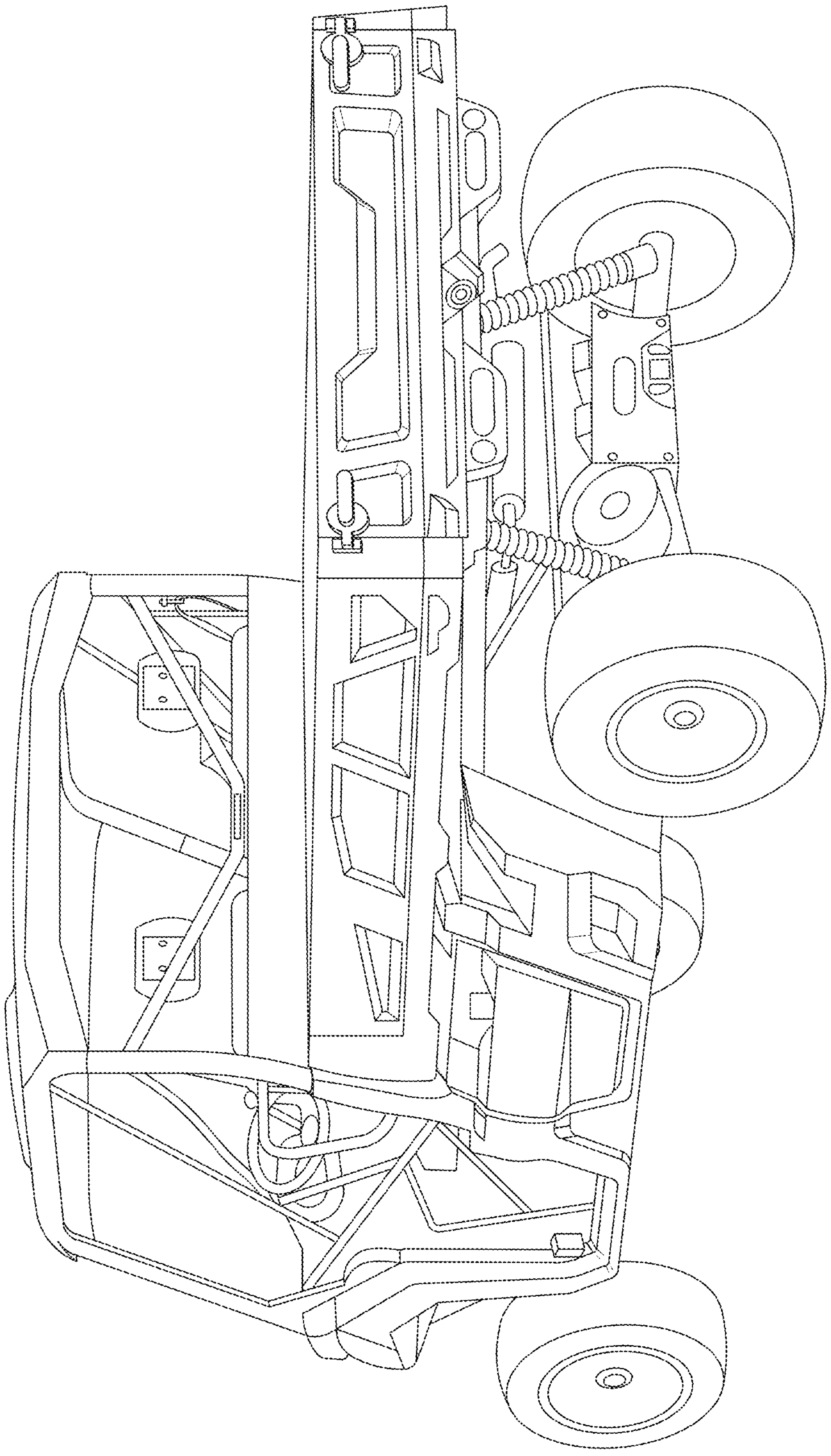
FIG. 1A (PRIOR ART)
FIG. 1A is a diagram of a prior art off-road utility vehicle for use with the bracket fastening system, according to aspects of the present invention.

The Can-Am® Defender is one example of an off-road vehicle illustrated in FIG. 1A. The cargo bed of the Can-Am® Defender is much smaller than that of a truck. A popular storage cooler for use in off-roading activities is the Big Frig® 20-quart cooler illustrated in FIG. 1B. Without securing the cooler, it is likely to bounce out during off-roading activities. A ratchet strap can be used to secure the cooler, but more space in the bed is occupied by the extensions of the straps. Additionally, by strapping down your cooler with a ratchet strap you are unable to gain access inside the cooler without unstrapping it every time.

Figure 1B:
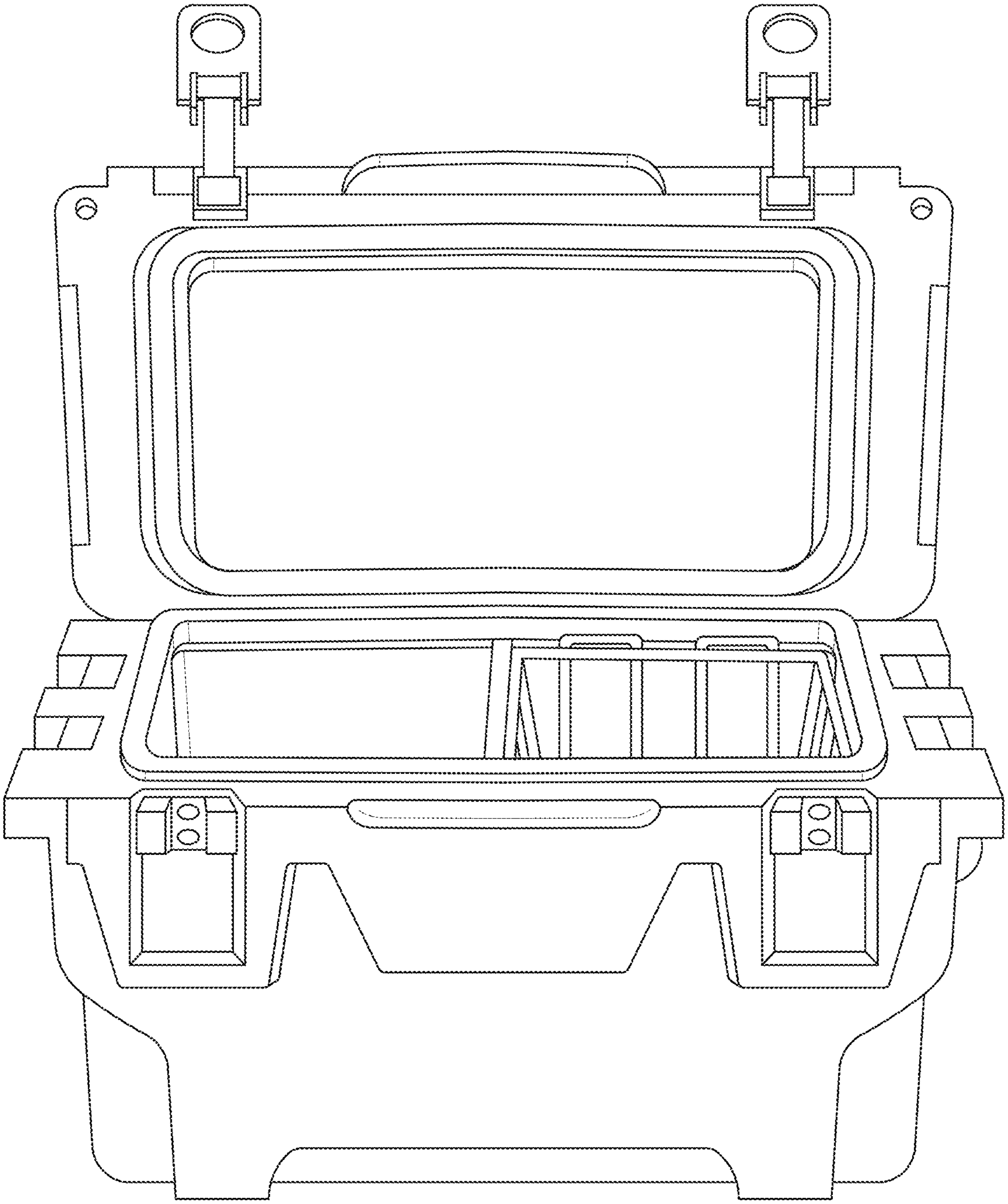
FIG. 1B (PRIOR ART)
FIG. 1B is a diagram of a prior art cooler for use with the bracket fastening system, according to aspects of the present invention.
Figure 1C:
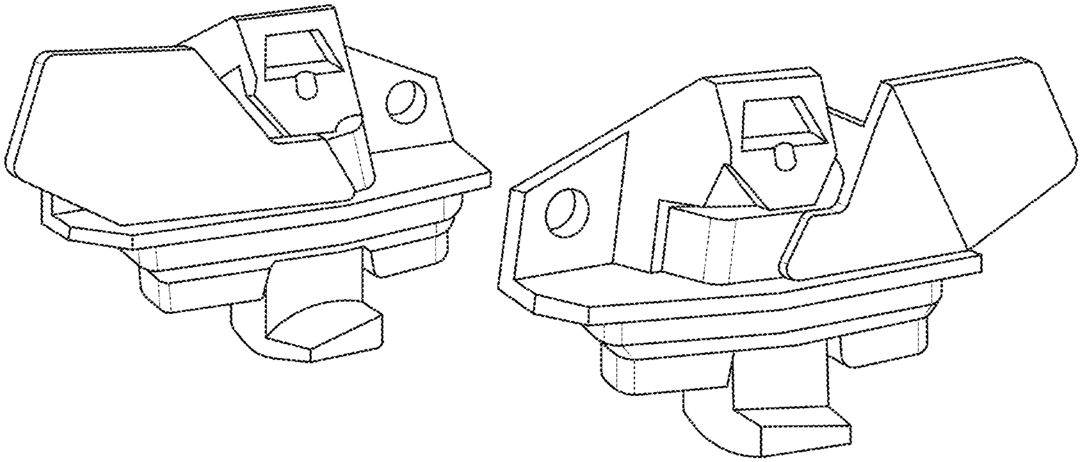
FIG. 1C (PRIOR ART)
FIG. 1C is a diagram of prior art fasteners for use with the bracket fastening system, according to aspects of the present invention.

Broadly, one embodiment of the present invention relates to a pair of quick connect brackets including quick release fasteners, illustrated in FIG. 1C, that are used to secure a cooler, for example a Big Frig® 20-quart cooler illustrated in FIG. 1B, in the cargo bed of an All-Terrain Vehicle (ATV), for example a Can-AM® Defender, illustrated in FIG. 1A. Each of the pair of quick connect brackets include a substantially F-shaped or f-shaped frame that attaches to a quick release fastener designed to be installed to the frame of a cargo bed of the ATV.

In embodiments, the quick connect brackets are affixable to the cargo bed of a vehicle, such as a Can-AM® Defender, but is not so limited. In embodiments, the quick release fastener can be LinQ® fasteners manufactured by Can-AM® as an original equipment manufacturer part. However, it is understood that the quick release brackets can be modified to fit any fastening mechanism, and can be mating according to the functionality of the specific fastening mechanism.

In embodiments, the quick connect brackets can be made from metal, such as steel, and can be treated to prevent weathering, corrosion, fatigue and/or degradation. Such treatments can include, but are not limited to powder coating, rust proofing, painting, etc.

Figure 2:
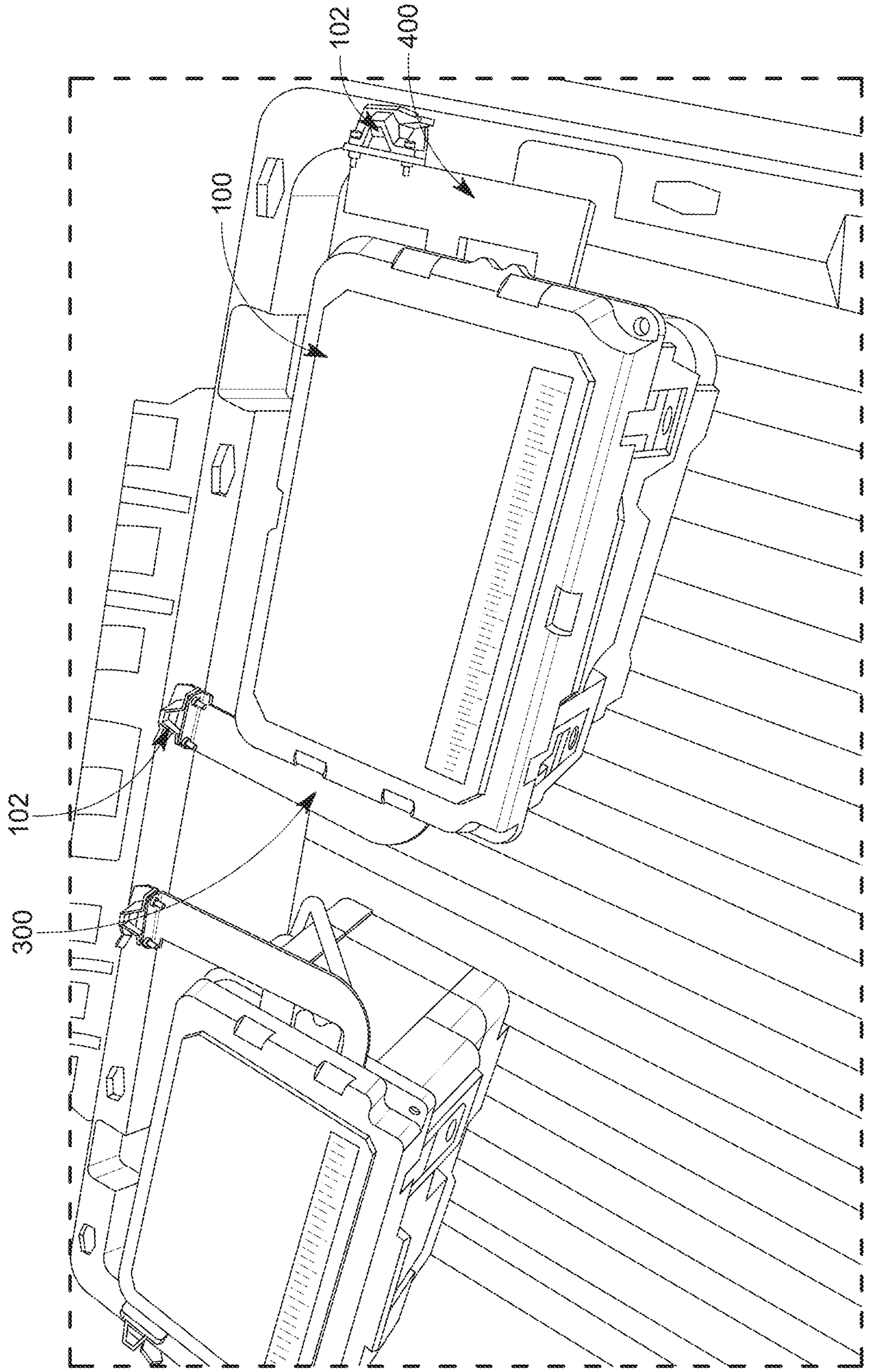
FIG. 2 is a top perspective view of an embodiment of the overall bracket fastening system.

Referring to FIG. 2, an overall view of a first a pair of quick connect brackets configured to secure a cooler 100 to the cargo bed of an ATV are illustrated. The pair of quick connect brackets can include an inner bracket 300 and an outer bracket 400, wherein both the inner 300 and outer 400 brackets are configured to be mounted to a perimeter of the ATV cargo bed. An outer bracket 400 can be a bracket mounted parallel to its mounting surface on the ATV cargo bed, while an inner bracket 300 can be a bracket mounted perpendicular to its mounting surface on the ATV cargo bed. Both inner bracket 300 and outer bracket 400 are coupled to the ATV cargo bed via quick release fasteners 102. Both inner bracket 300 and outer bracket 400 are coupled to quick release fasteners 102 by known fastening systems, such as, but not limited to screws, zip ties, nut and bolt pairs, welds, etc. The lid of cooler 100 can, when closed, provide additional security for both inner bracket 300 and outer bracket 400. Advantageously, the inventive bracket fastening system can maintain the security of cooler 100 in the cargo bed of the ATV, while allowing access to items stored inside when the lid of cooler 100 is opened.

Figure 3:
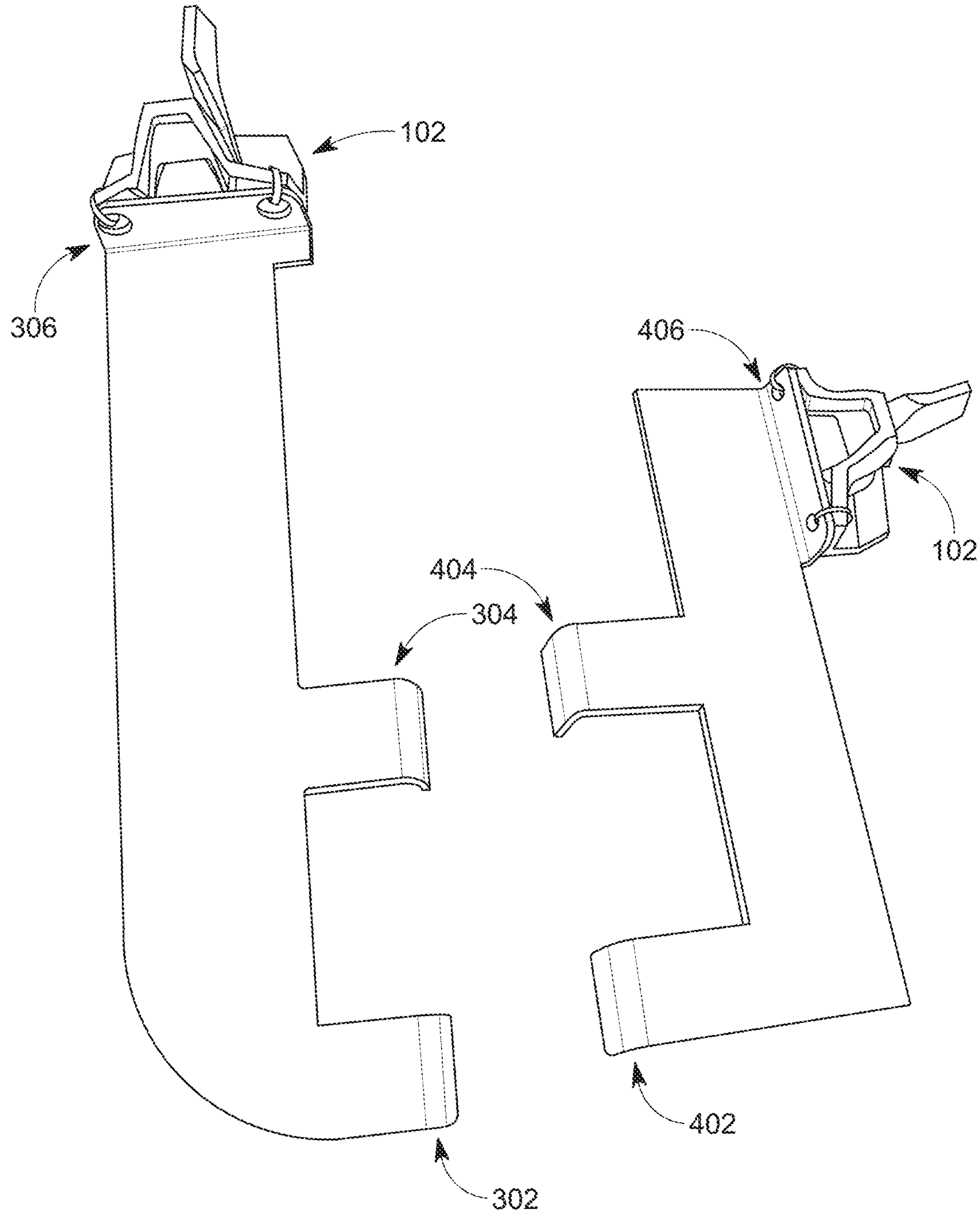
FIG. 3 is a top perspective view of a first embodiment of brackets with fasteners.

Referring to FIG. 3, a first embodiment of the inventive bracket fastening system is illustrated. An outer bracket 400 can include a substantially F-shaped frame with a first arm 402, a second arm 404, and a mounting plate 406 extending outwardly therefrom. Both the first arm 402 and the second arm 404 can extended outwardly in the same direction, and can be bent, at a midpoint portion, at a substantially 90 degree angle to form mating portions. The mounting plate 406 can be disposed on an opposite side of the F-shaped frame from the first arm 402 and the second arm 404, and can extended outwardly therefrom. The mounting plate 406 can be bent at a substantially 90 degree angle to form a mounting interface. The mounting interface 406 can have holes thereon to accept screws, zip ties, nuts and bolts, and/or other fasteners. The outer bracket 400 can be made from durable material such as, but not limited to, steel, iron, aluminum, etc., and can be powder coated to prevent oxidation, or rusting. A quick release fastener 102 can be removably attached to the outer bracket at the mounting interface, utilizing fasteners. In embodiments, the quick release fastener 102 can be any apparatus configured to be securably attached to the ATV cargo bed. In a preferred embodiment, the quick release fastener 102 can be LinQ® fasteners manufactured by Can-AM® as an original equipment manufacturer part.

An inner bracket 300 can include a substantially f-shaped frame, with a first arm 302, a second arm 304, and a mounting plate 306 extending outwardly therefrom. In embodiments, the substantially f-shaped frame of inner bracket 300 is reflected about an axis, such that if oriented with mounting plate 306 on a horizontal surface, the f-shape would be a backwards “f”. Both the first arm 302 and the second arm 304 can extended outwardly in the same direction, and can be bent, at a midpoint portion, at a substantially 90 degree angle to form mating portions. The mounting plate 306 can be disposed at a base of the f-shaped frame, and can extended outwardly therefrom. The mounting plate 306 can be bent at a substantially 90 degree angle to form a mounting interface. The mounting interface can have holes thereon to accept screws, zip ties, nuts and bolts, and/or other fasteners. A quick release fastener 102 can be removably attached to the inner bracket at the mounting interface, utilizing fasteners. The inner bracket 300 can be made from durable material such as, but not limited to, steel, iron, aluminum, etc., and can be powder coated to prevent oxidation, or rusting. In embodiments, the quick release fastener 102 can be any apparatus configured to be securably attached to the ATV cargo bed. In a preferred embodiment, the quick release fastener 102 can be LinQ® fasteners manufactured by Can-AM® as an original equipment manufacturer part.

Figure 4:
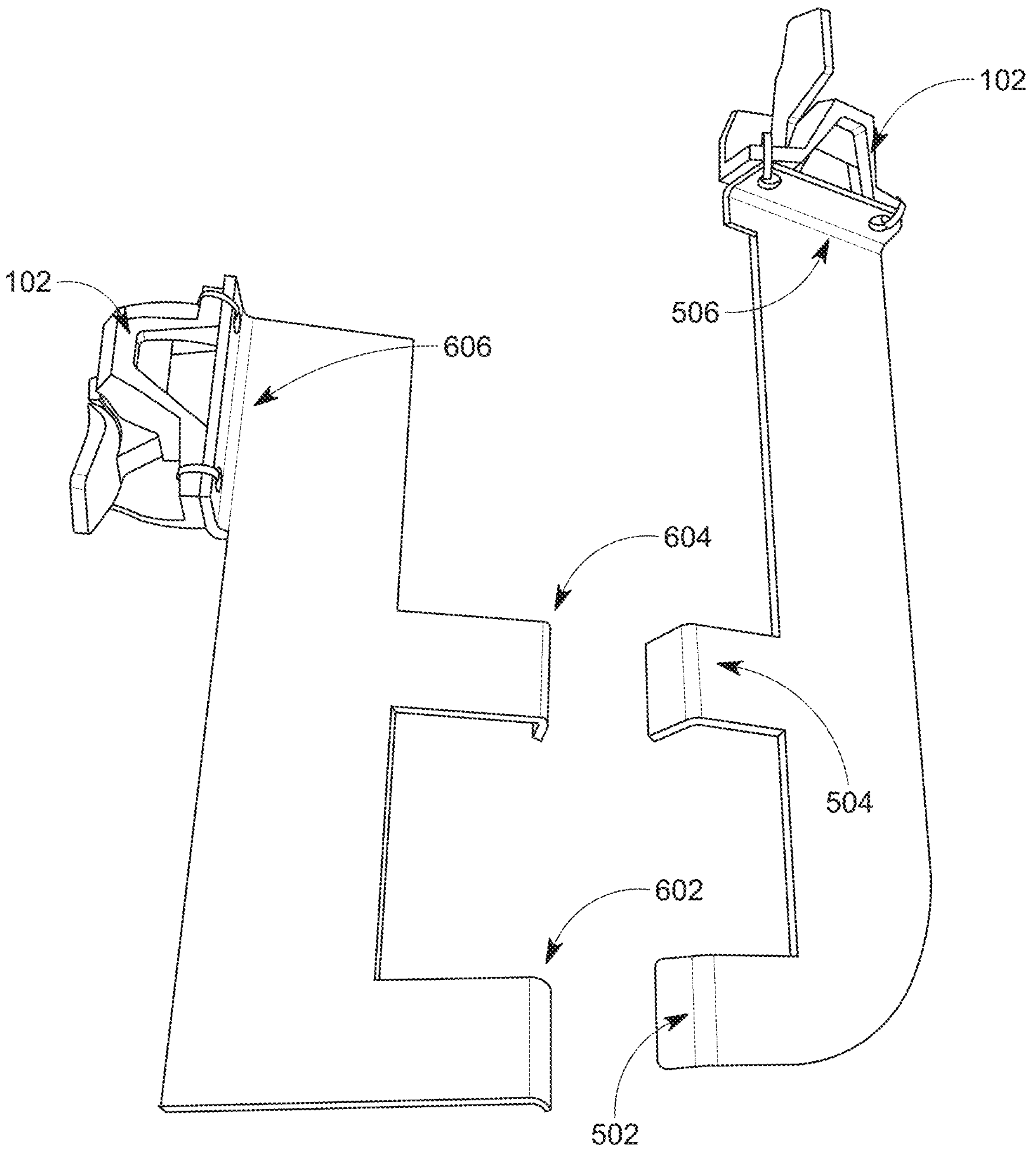
FIG. 4 is a top perspective view of a second embodiment of brackets with fasteners.

Referring to FIG. 4, a second embodiment of the inventive bracket fastening system is illustrated. An outer bracket 600 can include a substantially F-shaped frame with a first arm 602, a second arm 604, and a mounting plate 606 extending outwardly therefrom. In embodiments, the substantially F-shaped frame of inner bracket 300 is reflected about an axis, such that if oriented with mounting plate 306 on a horizontal surface, the F-shape would be a backwards “F”. Both the first arm 602 and the second arm 604 can extended outwardly in the same direction, and can be bent, at a midpoint portion, at a substantially 90 degree angle to form mating portions. The mounting plate 606 can be disposed on an opposite side of the F-shaped frame from the first arm 602 and the second arm 604, and can extended outwardly therefrom. The mounting plate 606 can be bent at a substantially 90 degree angle to form a mounting interface. The mounting interface 606 can have holes thereon to accept screws, zip ties, nuts and bolts, and/or other fasteners. The outer bracket 600 can be made from durable material such as, but not limited to, steel, iron, aluminum, etc., and can be powder coated to prevent oxidation, or rusting. A quick release fastener 102 can be removably attached to the outer bracket at the mounting interface, utilizing fasteners. In embodiments, the quick release fastener 102 can be any apparatus configured to be securably attached to the ATV cargo bed. In a preferred embodiment, the quick release fastener 102 can be LinQ® fasteners manufactured by Can-AM® as an original equipment manufacturer part.

An inner bracket 500 can include a substantially f-shaped frame with a first arm 502, a second arm 504, and a mounting plate 506 extending outwardly therefrom. Both the first arm 502 and the second arm 504 can extended outwardly in the same direction, and can be bent, at a midpoint portion, at a substantially 90 degree angle to form mating portions. The mounting plate 506 can be disposed at a base of the f-shaped frame, and can extended outwardly therefrom. The mounting plate 506 can be bent at a substantially 90 degree angle to form a mounting interface. The mounting interface can have holes thereon to accept screws, zip ties, nuts and bolts, and/or other fasteners. A quick release fastener 102 can be removably attached to the inner bracket at the mounting interface, utilizing fasteners. The inner bracket 500 can be made from durable material such as, but not limited to, steel, iron, aluminum, etc., and can be powder coated to prevent oxidation, or rusting. In embodiments, the quick release fastener 102 can be any apparatus configured to be securably attached to the ATV cargo bed. In a preferred embodiment, the quick release fastener 102 can be LinQ® fasteners manufactured by Can-AM® as an original equipment manufacturer part.

Figure 5:
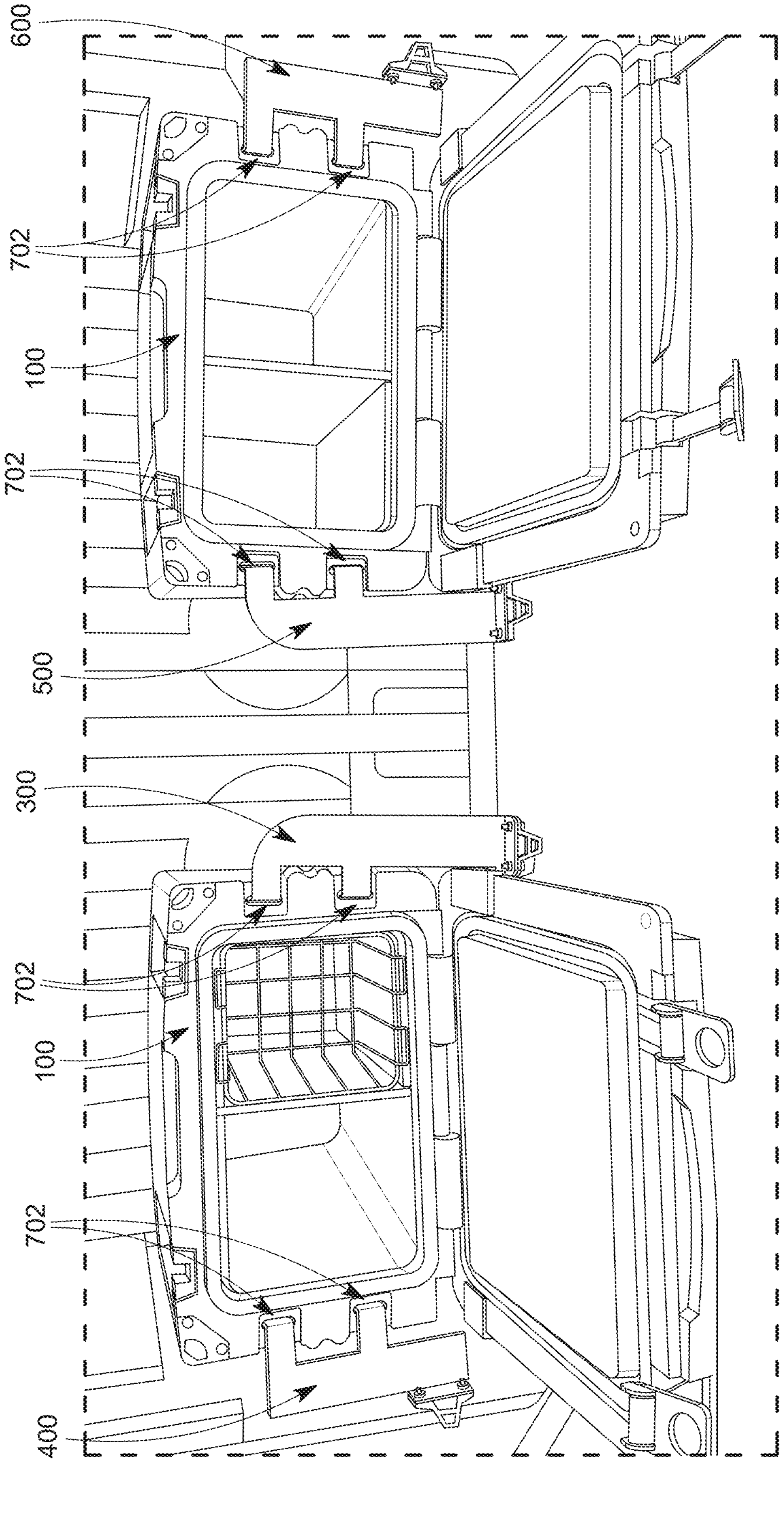
FIG. 5 is a top view of an embodiment of the overall bracket fastening system.

Referring to FIG. 5, a system for securing at least two coolers in the bed of an ATV utilizing at least two pair of quick connect brackets, as described above, is illustrated. A first cooler 100 and second cooler 100 can be placed into a cargo bed of an ATV, to facilitate secure storage thereof. In embodiments, the cooler can be a Big Frig® 20-qt cooler and the ATV can be a Can-Am® Defender. In order to secure the coolers, outer quick connect brackets 400 and 600 can be coupled to the perimeter of the cargo bed utilizing the quick release fastener 102 of the outer brackets 400 and 600. Once secured to the cargo bed, mating portions of the outer quick connect bracket, can be inserted into apertures 702 along a first portion of the cooler flange 702. Inner quick connect brackets 300 and 500 can be coupled to the perimeter of the cargo bed utilizing the quick release fastener 102 of the inner brackets 300 and 500. Once secured to the cargo bed, mating portions of the inner quick connect brackets 300 and 500 can be inserted into apertures 702 along a second portion of the cooler flange. The process may be repeated for additional coolers, as needed, to form a system of secured coolers in the cargo bed of an ATV.

In an embodiment, one or more brackets can be reconfigured for use with a different size cooler, different model cooler, different truck bed design, different brand UTV/SXS (Utility Vehicle/Side by Side) vehicle, or any combination thereof. In some embodiments, the height, length, or width of one or more brackets can be changed. In some other embodiments, one or more arms on one or more brackets can be removed/repositioned. In additional embodiment, the one or more arms are used to lock a bracket into one or more molded holes under the cooler lid.

It should be understood, of course, that the foregoing relates to exemplary embodiments of the invention and that modifications may be made without departing from the spirit and scope of the invention as set forth in the following claims and their equivalents.

What is claimed is:

1. A system for fastening a cooler, the system comprising:

A quick release bracketing apparatus, comprising:
- an inner bracket monolithically formed, comprising:
  - a first body;
  - a first plurality of arms and at least one first mounting plate, extending from the first body; and
  - a first quick release fastener mounted to the at least one first mounting plate;
- an outer bracket monolithically formed, comprising:
  - a second body;
  - a second plurality of arms and at least one second mounting plate, extending from the second body; and
  - a second quick release fastener mounted to the at least one first mounting plate;

a cooler, comprising:
- a base, sidewalls, and a top, with a door hingedly coupled to at least one of the base, the sidewalls or the top;
- a plurality of apertures disposed on a flange of the cooler;

wherein each of the first plurality of arms and the second plurality of arms is fit into a separate one of the plurality of apertures.

* * * * *